United States Patent
Töpfer (10) Patent No.: US 9,776,266 B2
(45) Date of Patent: Oct. 3, 2017

(54) BEVEL GEAR HAVING MODIFIED GEOMETRY

(71) Applicant: Klingelnberg AG, Zürich (CH)

(72) Inventor: Gary Töpfer, Remscheid (DE)

(73) Assignee: KLINGELNBERG AG (CH)

( * ) Notice: Subject to any disclaimer, the term of this patent is extended or adjusted under 35 U.S.C. 154(b) by 0 days.

(21) Appl. No.: 14/816,606

(22) Filed: Aug. 3, 2015

(65) Prior Publication Data

US 2016/0040769 A1    Feb. 11, 2016

(30) Foreign Application Priority Data

Aug. 11, 2014   (EP) .................................... 14002803

(51) Int. Cl.
*F16H 55/17* (2006.01)
*B23F 1/00* (2006.01)

(52) U.S. Cl.
CPC .............. *B23F 1/00* (2013.01); *F16H 55/17* (2013.01)

(58) Field of Classification Search
CPC .... F16H 55/0846; F16H 55/088; F16H 55/08; F16H 55/17
See application file for complete search history.

(56) References Cited

U.S. PATENT DOCUMENTS

| | | | | |
|---|---|---|---|---|
| 253,863 A | * | 2/1882 | Haskin | ................ F16H 55/0846 74/459.5 |
| 1,286,849 A | * | 12/1918 | Walter | ................ F16H 55/0846 74/459.5 |
| 5,528,952 A | * | 6/1996 | Takita | ................ F16H 55/17 74/459.5 |
| 6,068,571 A | | 5/2000 | Irwin | |
| 2012/0048048 A1 | * | 3/2012 | Benedict | ................ B21K 1/30 74/459.5 |

FOREIGN PATENT DOCUMENTS

| | | |
|---|---|---|
| DE | 4425496 A1 | 2/1995 |
| WO | 2005057052 A1 | 6/2005 |

OTHER PUBLICATIONS

European Search Report issued Jan. 1, 2015 for European Patent Application No. 14002803.6. 4 pages.
No Author. DIN 3971—Begriffe und Bestimmungsgrößen für Kegelräder und Kegelradpaare (DIN 3971—Definitions and Parameters for Bevel Gears and Bevel Gear Pairs). Standard by Deutsches Institut fur Normung E. V. (German National Standard). Jul. 1, 1980. 6 pages.

* cited by examiner

*Primary Examiner* — David M Fenstermacher
*Assistant Examiner* — Jake Cook
(74) *Attorney, Agent, or Firm* — McCarter & English, LLP

(57) ABSTRACT

Bevel gear having a main body comprises a heel-side skin surface. The bevel gear has at least one tooth gap, which exits from the main body in the region of the skin surface. The tooth gap has a tooth base, the profile of which is defined by a base cone angle in relation to the workpiece axis of rotation. A concentric circumferential ring structure is provided on the skin surface, which is raised in relation to the skin surface, and which results in a heel-side exit angle between the tooth base and the ring structure, which is in the range between 125° and 160°.

16 Claims, 6 Drawing Sheets

BEVEL GEAR HAVING MODIFIED GEOMETRY

CROSS-REFERENCE TO RELATED APPLICATION

This application claims priority under 35 U.S.C. §§119(a)-(d) to European Patent Application No. EP 14 002 803.6, filed Aug. 11, 2014, which is hereby incorporated by reference in its entirety as part of the present disclosure as if fully set forth herein.

FIELD OF THE INVENTION

The present invention relates to the deburring of the tooth edges of bevel gears. In particular, the invention relates to bevel gears having correspondingly modified geometry.

BACKGROUND

A burr arises during the manufacturing of bevel gears, depending on the tool used and technology used, due to the chip producing machining on the outer tooth end.

Before the burr formation and the deburring are discussed, the corresponding environment is to be defined more precisely on the basis of several fundamental considerations and on the basis of drawings.

Figure 1A:
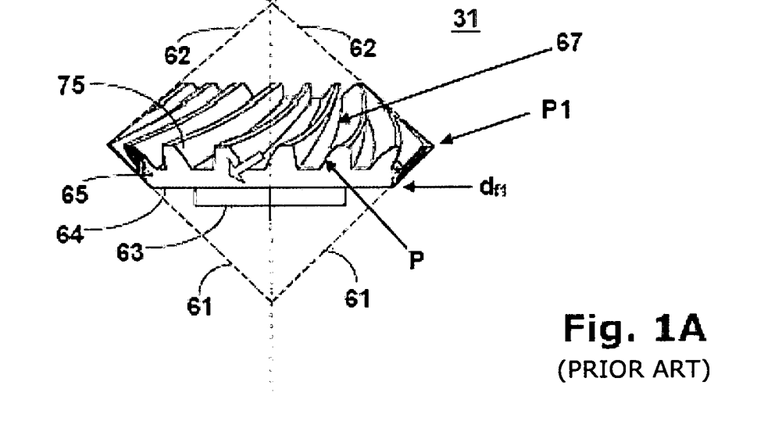
FIG. 1A is a schematic side view of a bevel gear pinion.
Figure 1B:
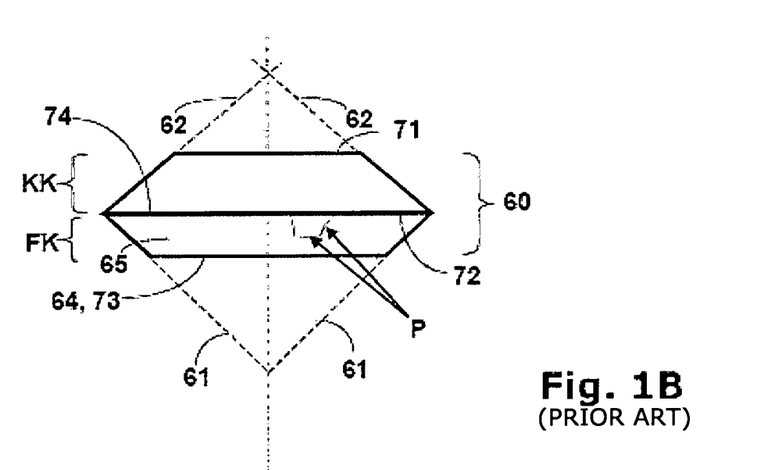
FIG. 1B is a schematic side view of the main body of the bevel gear pinion from FIG. 1A, wherein the exit of a single tooth gap in the region of the heel is indicated.

FIG. 1A shows a schematic side view of a bevel gear pinion 31, wherein elements and terms are defined based on this side view and as they are used in the present application. FIG. 1B shows the main body 60 of a bevel gear pinion 31 according to FIG. 1A in schematic form. The example shown relates to a bevel gear pinion 31 having curved flank longitudinal line. However, the invention may also be applied to other bevel gears 31. In the example shown, the bevel gear pinion 31 has a main body 60, which is defined by two truncated cones KK and FK having corresponding cone skin surfaces, as shown in FIG. 1B. These cone skin surfaces are, strictly speaking, truncated cone skin surfaces. The cone skin surfaces of the corresponding full cone provided with the reference signs 61 and 62 are referred to as the back cone surface and as the head cone surface. The intersection lines of the back cone surface with the plane of the drawing are shown by the auxiliary lines 61. The intersection lines of the head cone surface with the plane of the drawing are shown by the auxiliary lines 62. The two truncated cones KK and FK each have a cover surface 71 and 73, respectively, and a main surface 72 and 74, respectively, extending in parallel thereto. Both truncated cones KK and FK are arranged coaxially to the workpiece axis of rotation R1, wherein the main surface 72 of the truncated cone KK touches the main surface 74 of the truncated cone FK. The two truncated cones KK and FK are thus oriented opposite to one another in the example shown.

The teeth 75 of the bevel gear pinion 31 extend along the head truncated cone skin surface. The reference end face of the truncated cone 31 is identified with 63 and the rear end face is identified with 64. The end face 64 corresponds here to the cover surface 73 of the truncated cone FK. The truncated cone skin surface shown in gray in FIG. 1A, which represents a ring-shaped part of the rear cone surface, is referred to here in general as a (ring-shaped) heel-side skin surface 65. In the transition region from the teeth 75 to the heel-side skin surface 65, burrs 70 can arise during the chip producing machining (referred to here as gear cutting or gear chip producing machining) (see FIG. 3). These burrs form above all on the concave tooth flanks of the teeth 75 or in the transition region of the concave tooth flanks to the heel-side skin surface 65, respectively. This transition region is identified with P in FIG. 1A, wherein it is to be noted that the burrs 70 can occur both on the tooth flanks and on the tooth base. A burr 70 usually arises only on the heel (in the region P here), when milling is performed from the inside to the outside, i.e., when a tool coming through the tooth gap 67 exits from this tooth gap 67 in the region of the heel-side skin surface 65. In FIG. 1A, a block arrow is drawn in the tooth gap shown in the middle, which indicates the cutting direction of a tool during the exit from this tooth gap 67. In FIG. 1, the passage of a tooth gap 67 through the surface 65 in the region of the rear cone skin surface 65 is shown by dotted lines.

Figure 2:
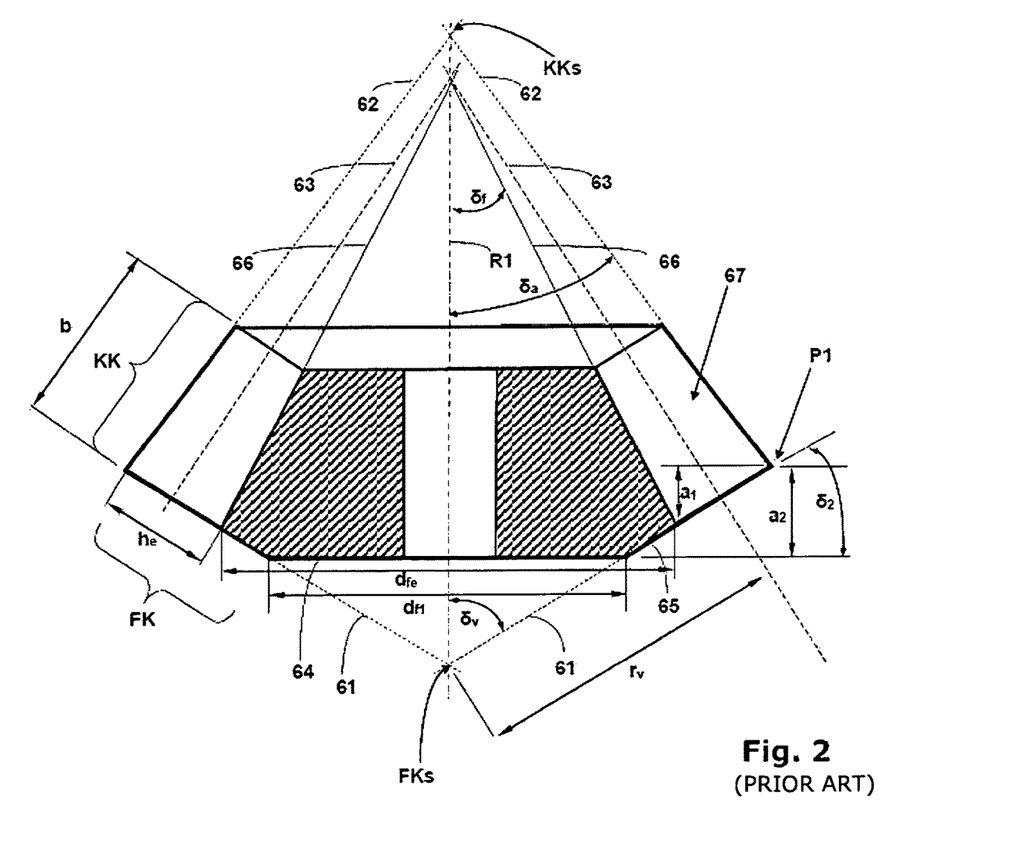
FIG. 2 is a schematic sectional view (axial section) of a further bevel gear pinion, which is used for defining various terms.

FIG. 2 shows details of a further bevel gear 31, wherein this image was derived from the standard DIN 3971, "Begriffe und Bestimmungsgrößen für Kegelräder und Kegelradpaare [terms and determinants for bevel gears and bevel gear pairs]", July 1980. The terms of this DIN standard are used hereafter, as they are required and relevant. FIG. 2 shows an axial section. Auxiliary lines are shown in the region of the head truncated cone KK, which all intersect with the workpiece axis (of rotation) R1. Viewed from the outside to the inside, the following auxiliary lines 62, 63, and 66 are to be found in the region of the head cone, wherein the auxiliary lines 62 are intersection lines (dashed) of the head cone skin surface with the plane of the drawing, the auxiliary lines 63 are: intersection lines (dashed) of the index cone skin surface with the plane of the drawing, and the auxiliary lines 66 are intersection lines (solid lines) of the heel cone skin surface with the plane of the drawing.

The head cone tip is identified with KKs. In the example shown, the mentioned intersection lines 62, 63, and 66 do not extend in parallel to one another, but rather they are each defined by different cone angles. The base cone angle $\delta_f$ is of particular significance for the invention. This angle is therefore shown in FIG. 2. In the case shown, the tips of the head cone KKs, the index cone, and the base cone do not lie in the same point of the workpiece axis R1. Therefore, the tooth height h increases considered in the direction of the tooth width p (originating from the head cone tip KKs). The tooth height during the passage through the heel-side skin surface 65 is identified with $h_e$ (see FIG. 2). In the case shown, the teeth are shorter at the small diameter of the bevel gear (called the toe) than at the large diameter (called the heel).

Auxiliary lines are also shown in the region of the heel cone in the example. These are the auxiliary lines 61 (dashed) of the heel cone skin surface with the plane of the drawing. These auxiliary lines 61 intersect with the workpiece axis R1 in the heel cone tip FKs. The cone angle $\delta_v$ of the heel cone is also of particular significance for the invention. This angle is therefore also shown in FIG. 2. Furthermore, the following angles are important: head cone angle $\delta_a$ and angle of the heel edge $\delta_2$.

Figure 3:
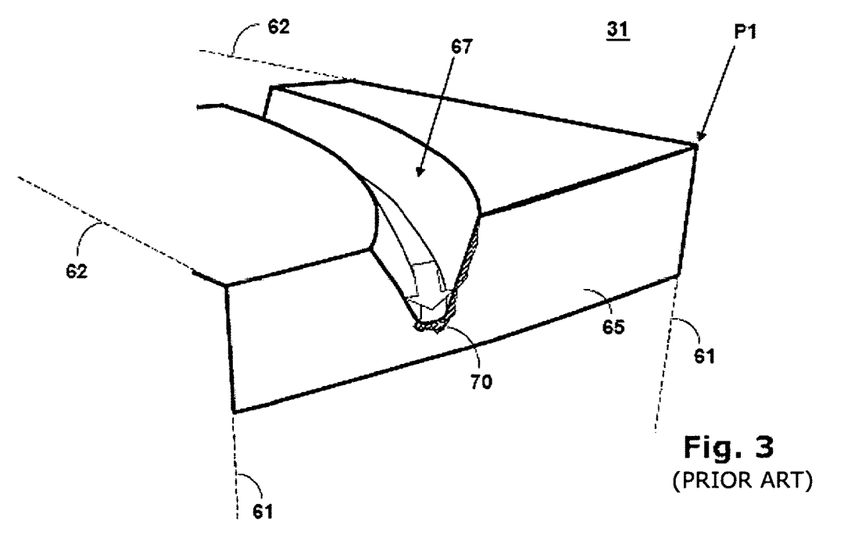
FIG. 3 is a schematic perspective view of a part of a further bevel gear, which only has one tooth gap here, wherein a burr has formed during the gear cutting in the base region on the heel and on the concave tooth flank.

The mentioned burrs primarily form in the region of the heel-side skin surface 65. A simplified and enlarged illustration of a bevel gear 31 is shown in FIG. 3, which only has a single tooth gap 67 here. The bevel gear 31 of FIG. 3 has a large base cone angle $\delta_f$ on the cone head ($\delta_f$ is approximately 80° here). The cone angle $\delta_v$ of the heel cone is approximately 10° here. The specifications and the corresponding drawings are solely of a schematic nature and are only to be understood as examples for better illustration.

The passage of the tooth gap 67 through the heel-side skin surface 65 approximately has a U-shape or V-shape here. A burr formation can occur in the region of the lateral legs of the U-shape (above all on the concave tooth flank, which is located on the right in the region of the tooth gap 67 here) and in the base region of the U-shape. The following relates in particular to the burr formation in the base region. A burr 70 (also referred to as a heel-side burr here) is indicated (shown shaded) in simplified form in FIG. 3, which extends in the base region and along the concave tooth flank. A block arrow is also shown here (as in FIG. 1A) in the tooth gap 67, which indicates the cutting direction of a tool, which is moved through the tooth gap 67 and leaves the tooth gap 67 in the region of the heel-side skin surface 65.

The present invention relates especially to the heel-side burrs 70 of bevel gears, since the burrs 70 are particularly complex and difficult to deburr.

It is considered to be a further disadvantage that special milling cutters may be used to remove heel-side burrs in bevel gears.

Figure 4:
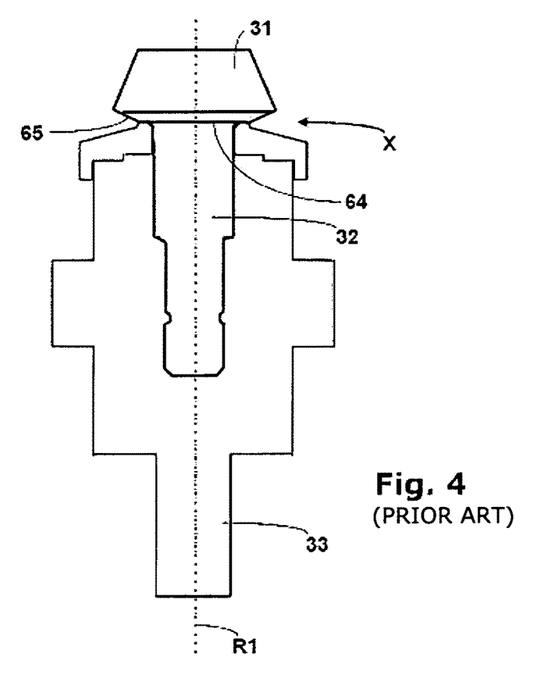
FIG. 4 is a schematic sectional view through a clamping device having a chucked bevel gear pinion.

In the production of bevel gear pinions, the deburring is particularly problematic especially on the heel side of the bevel gear pinion, since the rear end face 64 of the bevel gear 31 is frequently accessible only partially or not at all in a conventional gear cutting machine, as can be inferred from schematic FIG. 4.

FIG. 4 shows a schematic sectional view of a bevel gear 31 having shaft 32. The shaft 32 is accommodated in a workpiece spindle 33. The heel-side skin surface 65 is only accessible with difficulty in the region X, since little space is present between the skin surface 65 and the workpiece spindle 33.

The deburring in the base region on the heel side is only possible with effort for the mentioned reasons.

SUMMARY OF THE INVENTION

The invention is based on the problem of finding a solution for the deburring on the tooth base. It relates above all to the deburring of a heel-side burr on the tooth base of a bevel gear.

These problems are solved according to the invention by a bevel gear, which prevents the formation of a heel-side burr on the tooth base because of its shaping. In this manner no burr can form at all, which then has to be removed in a complex manner. The invention thus does not relate to a machine solution, which is to enable the deburring on the tooth base with technical effort, but rather the invention follows a completely new path, by reducing or preventing the problem by way of suitable shaping.

The invention is based on the finding that a burr forms when the local cutting conditions between tool and workpiece are unfavorable. It has been shown that a burr forms above all on those edges that have an exit angle which is less than 120°. The exit angle has an influence on whether the forming of the metal of the workpiece takes place during the machining, or whether an actual cutting procedure prevents the formation of a burr. During the cutting procedure of the gear cutting, the cutting edge of a tool penetrates into the metal material, which is thus elastically and plastically deformed. The material begins to flow after exceeding a limiting value. In dependence on the cutting edge geometry, the deformed material forms into a chip, which runs out via the rake face on the tool. In the case of an exit angle of a tooth gap that is greater than 120°, the chips arising on the tooth base can be cut off cleanly. If the exit angle is less than 120°, burrs form due to the plastic deformation.

A bevel gear of the invention is distinguished by a specially shaped main body, which results from a head truncated cone and a heel truncated cone, which are both arranged concentrically in relation to a workpiece axis (of rotation) and are oriented opposite to one another. The head truncated cone has a ring-shaped head cone skin surface (head truncated cone skin surface) and the heel truncated cone has a ring-shaped heel cone skin surface (heel truncated cone skin surface). The head truncated cone is defined by a head cone angle, which is between 0° and 90°. The heel truncated cone is defined by a heel cone angle, which is between 0° and 90°. The bevel gear has, in the region of the head truncated cone skin surface, at least one tooth gap that penetrates the heel truncated cone skin surface. The tooth gap exits from the material of the workpiece in the region of the heel truncated cone skin surface. This tooth gap has a tooth base, the profile of which is defined by a base cone angle.

According to the invention, a circumferential ring structure is provided on the heel truncated cone of the workpiece, which is raised in relation to the heel cone skin surface, which is tapered in the direction of the workpiece axis (of rotation). This ring structure defines a heel-side exit angle on the tooth base, which may be in the range between 125° and 160° in some embodiments according to the invention.

The heel-side exit angle on the tooth base may be in the range between 135° and 150° in some embodiments, wherein the limits are also included in each of these range specifications.

The bevel gear of the invention may have, in some embodiments, a circumferential ring structure, which comprises at least one first ring surface and one second ring surface, wherein the ring structure has a triangular shape or a trapezoidal shape viewed in an axial section (through the main body of the workpiece). The bevel gear of the invention may also have, in some embodiments, a circumferential ring structure, which has an edge-free configuration and has a convex shape in an axial section through the bevel gear.

The bevel gear of the invention preferably has, in some embodiments, a circumferential ring structure having the exit angle in the heel-side exit region of the tooth gap, which specifies an effective heel cone angle that is greater than the heel cone angle of the heel truncated cone of the main body.

Specifying a circumferential ring structure on the heel-side truncated cone has the advantage that no burr arises on the tooth base on the heel side during the gear cutting. The application of a circumferential ring structure is possible, since the heel-side truncated cone has no function in the actual meaning.

The angle between the cutting edge of the tool (or the cutting velocity vector of the tool, respectively) and the material of the workpiece is important in some embodiments of the invention. In the tooth base, this relates to the angle between the movement of the head cutting edge of the tool (the movement direction approximately corresponds to the base cone) and the outer edge of the supplementary cone.

The circumferential ring structure is provided in some embodiments in the region of the outer (heel-side) tooth ends.

The blank of such a gearwheel is typically pre-machined in a lathe or turning machine, before it is then subjected to gear chip producing machining. A rotationally-symmetrical circumferential ring structure is therefore selected, which can be produced without problems during the turning machining of the blank.

According to the invention, a blank that is already provided with a circumferential ring structure on the heel-side truncated cone is preferably provided in the scope of turning machining.

BRIEF DESCRIPTION OF THE DRAWINGS

Exemplary embodiments of the invention will be described in greater detail hereafter with reference to the drawings.

DETAILED DESCRIPTION OF EMBODIMENTS OF THE INVENTION

Terms are used in conjunction with the present description which are also used in relevant publications and patents. However, it is to be noted that the use of these terms is only for better understanding. The inventive ideas and the scope of protection of the claims for protection are not to be restricted in the interpretation by the specific selection of the terms. The invention may readily be transferred to other term systems and/or technical fields. The terms are to be applied accordingly in other technical fields.

The invention may be applied in general to bevel gears 31, wherein crown gears are also to be included in the present context. In a crown gear, the gear teeth are applied to the circular end face of a cylinder.

The invention may be applied to bevel gears 31 having constant and varying tooth height h. The invention may also be applied to bevel gears 31 independently of the profile of the flank longitudinal line. The invention may thus be applied to straight-toothed bevel gears 31, helical-toothed bevel gears 31, and spiral-toothed bevel gears 31.

The shape of a bevel gear 31 is defined by various specifications. These may include, among others, the desired transmission ratio, the modulus, the carrying capacity, and the overlap. In addition, however, the rigidity or deflection, the mounting, and the installation dimensions in the installed state play a role. In addition to the macro-geometry of the actual gear teeth of the bevel gears, the shape of the main body (main geometry), in particular in the matters of deflection, mounting, and producibility, also plays a role.

Figure 5:
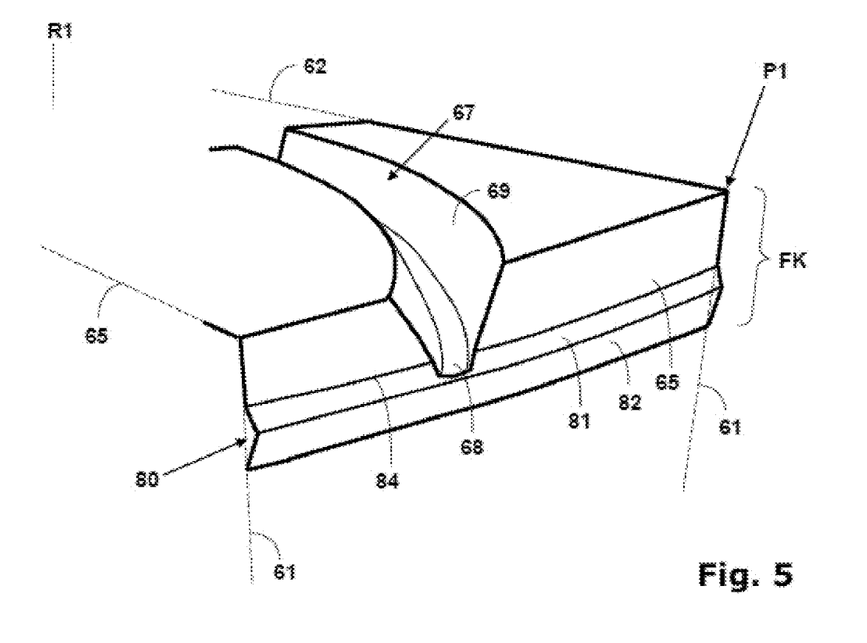
FIG. 5 is a schematic perspective view of a part of a first bevel gear according to the invention, which only has one tooth gap here, wherein the bevel gear comprises a circumferential ring structure on the heel.

FIG. 5 shows a first bevel gear 31 of the invention in a simplified view. The bevel gear 31 comprises a main body, which results from a head truncated cone KK and a heel truncated cone FK (as shown, for example, in FIG. 1B in the side view or in FIG. 2 in axial section). The head truncated cone KK and the heel truncated cone FK are arranged concentrically in relation to the workpiece axis of rotation R1. The head truncated cone KK has a ring-shaped head truncated cone skin surface and the heel truncated cone FK has a ring-shaped heel truncated cone skin surface. This ring-shaped heel truncated cone skin surface is identified here as the heel-side skin surface 65. In FIG. 5, the head truncated cone KK extends to the left from the point P1 and the heel truncated cone FK is located below the point P1.

The head truncated cone KK is defined by a head cone angle $\delta_a$ in relation to the workpiece axis of rotation R1 and the heel truncated cone FK is defined by a heel cone angle $\delta_v$ in relation to the workpiece axis of rotation R1, as specified in the cited DIN standard and as shown in FIG. 2.

In a bevel gear, the head cone angle $\delta_a$ is between 0° and 90° and the heel cone angle $\delta_v$ is between 0° and 90°. It is to be mentioned here that the heel truncated cone FK "mutates" into a cylinder in the case of a heel cone angle of 0° and into a flat ring surface or circular surface in the case of 90°. The invention may also be applicable for these special cases. Therefore, where necessary, a ring-shaped skin surface 65 is mentioned. This ring-shaped skin surface 65 is located concentrically in relation to the workpiece axis of rotation R1. The ring-shaped skin surface 65 can be part of a cylinder skin surface or part of the mentioned heel cone skin surface in some embodiments.

Furthermore, the bevel gear 31 has at least one tooth gap 67 in the region of the head truncated cone skin surface, as shown in FIG. 5. This tooth gap 67 penetrates the head cone skin surface 65, or the tooth gap 67 exits out of the material of the main body of the bevel gear 31 in the region of the base cone skin surface 65, respectively. The tooth gap 67 has a tooth base 68, the profile of which is defined by the base cone angle $\delta_f$ in relation to the workpiece axis of rotation R1 (see FIG. 2). The base cone angle $\delta_f$ can be identical to the head cone angle $\delta_a$ (if the tooth gap 67 has a constant tooth height h). However, in FIG. 2, the base cone angle $\delta_f$ is not equal to the head cone angle $\delta_a$, and the base cone angle $\delta_f$ is less than the head cone angle $\delta_a$.

According to the invention, in some embodiment, the bevel gear 31 has a circumferential ring structure 80, which is raised in relation to the heel cone skin surface 65, on the heel truncated cone FK. FIG. 5 shows a first example of a circumferential ring structure 80. The circumferential ring structure 80 defines a heel-side exit angle $\delta_1$, which is in the angle range between 125° and 160°.

Figure 6A:
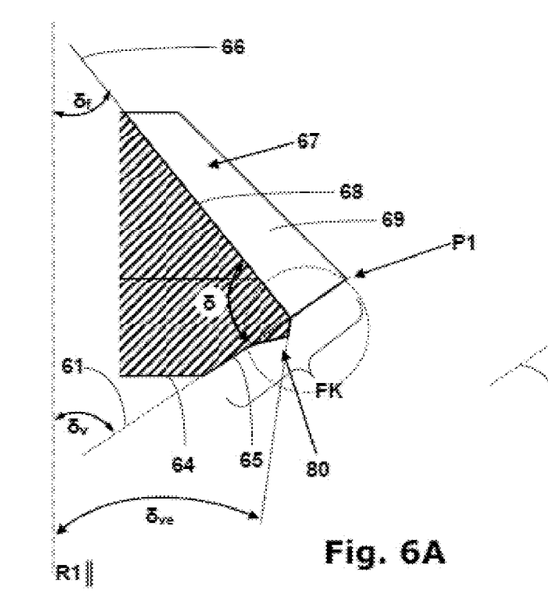
FIG. 6A is a schematic sectional view of a part of a further bevel gear pinion of the invention, wherein details of an exemplary circumferential ring structure are visible in section.
Figure 6B:
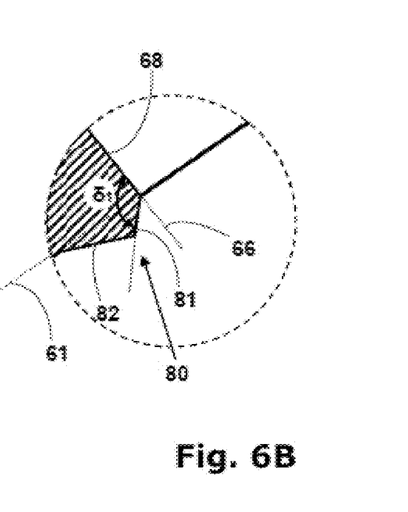
FIG. 6B is an enlarged detail from FIG. 6A.

Reference is made hereafter to FIGS. 6A and 6B, to be able to explain details of the invention more precisely. FIG. 6A shows a detail of an axial section through a further bevel gear 31 of the invention. The view of a right tooth flank 69 of a tooth is shown on the right in FIG. 6A. The tooth gap 67 is located in front of the tooth flank 69 in the view shown. FIG. 6B is an enlarged detail of FIG. 6A. The intersection line of the heel cone skin surface 65 with the plane of the drawing is shown on the basis of a dashed auxiliary line 61. The auxiliary line 66 is the intersection line of the base cone with the plane of the drawing. A parallel line to the workpiece axis of rotation R1 is shown by the reference sign R1∥.

The circumferential ring structure 80, which has an exemplary triangle shape in the section shown, is in the region of the heel-side skin surface 65. It can be seen in the enlarged illustration of FIG. 6B that the ring structure 80 begins immediately in the region of the tooth base 68. The ring structure 80 has a triangular shape having two ring surfaces 81 and 82 in axial section here, if one considers the three-dimensional main body of the bevel gear 31. The exit angle δ can be determined from the base cone angle $δ_f$ and the rear cone angle $δ_v$ as follows (see FIG. 6A):

$$δ=180-δ_f-δ_v \qquad (1)$$

The first ring surface 81 now defines an effective heel cone angle $δ_{ve}$, as shown in FIG. 6A. Because the heel cone angle $δ_{ve}$ is less than the rear cone angle $δ_v$, a heel-side exit angle $δ_1$ results, which is greater than the exit angle δ in previous bevel gears. This aspect of the invention can be inferred particularly clearly from FIG. 6B.

This exit angle $δ_1$, as already mentioned, may be in the angle range between 125° and 160° in some embodiments. By specifying an enlarged exit angle δ in relation to conventional bevel gears, the formation of a heel-side burr 70 is prevented during the gear cutting.

The geometry of the heel truncated cone FK is not arbitrarily selectable. Inter alia, it is important, for the rolling of a bevel gear pinion without problems using a crown wheel, which the teeth of the crown wheel can mesh without collision with the tooth gaps of the bevel gear pinion on the heel side on the bevel gear pinion. The location and shape of the heel truncated cone may therefore be selected so that a distance exists between tooth base and tooth head of the counter wheel, the so-called head-base clearance. This is to be approximately constant over the tooth width if possible. Teeth also have a base rounding to reduce the tension concentration in the tooth base, no contact can also occur between this tooth rounding and the head edge of the counter wheel under the various operating conditions. However, the distance cannot be excessively large, to prevent an unnecessary increase of the tooth base tensions, due to a greater lever arm of the force on the tooth engagement and the tooth base.

Figure 8:
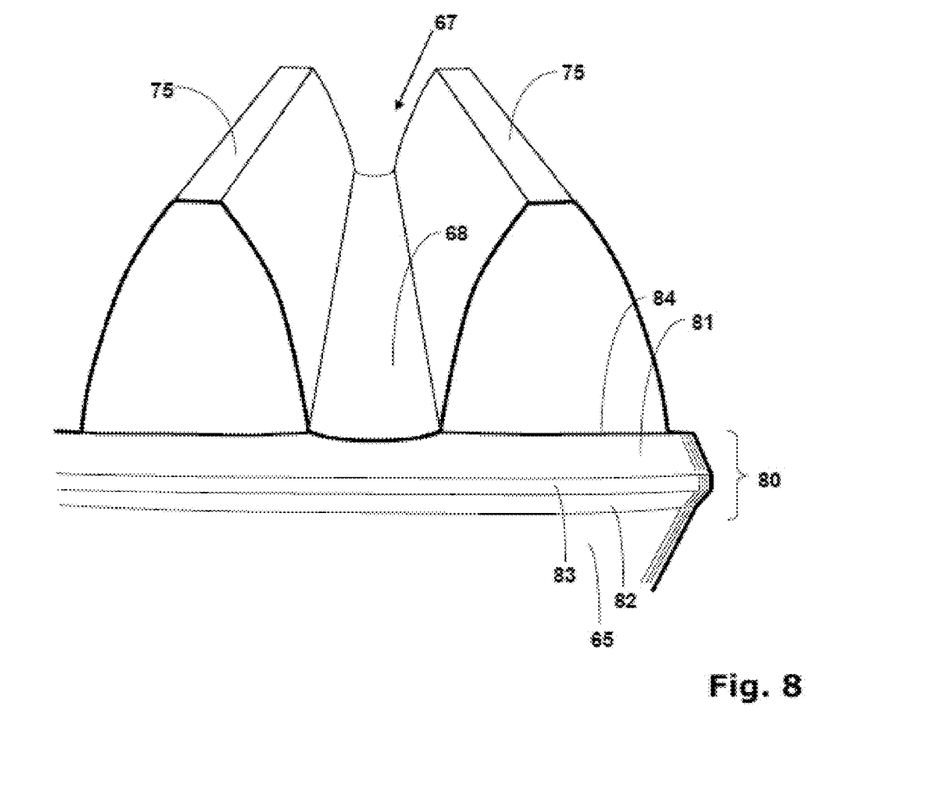
FIG. 8 is a schematic side view of a further bevel gear of the invention having circumferential ring structure, wherein two teeth and one tooth gap are shown.

The ring structure 80 can also have a trapezoid shape viewed in an axial section in some embodiments, as shown in FIG. 8. A ring structure 80 in trapezoidal shape can be composed, for example, of three ring surfaces 81, 82, and 83.

Due to the circumferential ring structure 80 of the invention, in some embodiments, an effective heel cone angle $δ_{ve}$, which is less than the heel cone angle $δ_v$ of the heel truncated cone FK, results in the heel-side exit region of the tooth gap 67.

The invention may be applied to bevel gears 31, which have a distance $a_2$ of the outer head cone edge P1 to the installation surface 64 on the heel truncated cone FK, which is sufficiently large that the tooth base 68 exits in the region of the inclined skin surface (also referred to as the heel-side skin surface 65) of the heel truncated cone FK. In other words, it can be stated that the axial component $a_1$ of the heel-side tooth height $h_e$ may be shorter than the distance $a_2$, as shown in FIG. 2.

Figure 7:
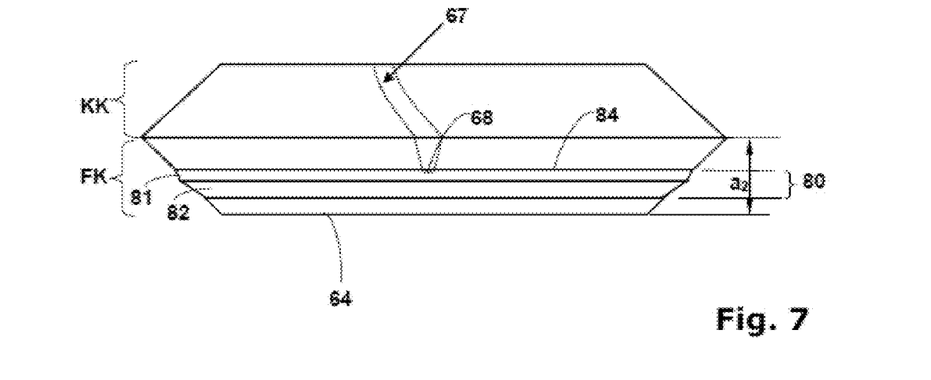
FIG. 7 is a schematic side view of a further bevel gear of the invention having circumferential ring structure, wherein a single tooth gap is indicated.

The circumferential ring structure 80 of the invention has an upper circular edge 84, which is located at the exit of the tooth base 68 through the skin surface 65. In FIG. 5, this circular edge 84 is located a short distance above the exit of the tooth base 68 through the skin surface 65. In FIG. 7 and FIG. 8, the circular edge 84 is located in each case at the exit of the tooth base 68. In the positioning of the circumferential ring structure 80, the manufacturing tolerances are to be considered, so that in each case the exit of the tooth base 68 through the skin surface 65 is located in the circumferential ring structure 80.

Bevel gears 31 of the invention have a circumferential ring structure 80, which comprises a first ring surface 81, which forms a part of a further truncated cone. This further truncated cone is arranged concentrically in relation to the workpiece axis of rotation R1 and it has an effective heel cone angle $δ_{ve}$, which is less than the heel cone angle $δ_v$.

FIG. 7 shows a schematic side view of a further bevel gear 31 of the invention having circumferential ring structure 80. The profile of a tooth gap 67 is shown, which extends in the region of the head truncated cone skin surface of the head cone KK. Where the tooth base 68 of the tooth gap 67 penetrates the heel truncated cone skin surface of the heel truncated cone FK, the ring structure 80 is seated on the heel truncated cone FK. FIG. 7 shows an embodiment in which the ring structure 80 can again be approximated by a triangle. Two ring surfaces 81, 82 of the corresponding triangle are visible in FIG. 7.

FIG. 8 shows a schematic side view of a part of a further bevel gear 31 of the invention having circumferential ring structure 80. The profile of a tooth gap 67 is shown, which is laterally delimited and/or defined by two teeth 75. The tooth gap 67 extends in the region of the head truncated cone skin surface of the head cone KK. Where the tooth base 68 of the tooth gap 67 penetrates the heel truncated cone skin surface of the heel truncated cone FK, the ring structure 80 is seated on the heel truncated cone FK. FIG. 8 shows an embodiment in which the ring structure 80 can be approximated by a trapezoid. Three ring surfaces 81, 82, 83 of the corresponding trapezoid are visible in FIG. 8. Shadings of the surfaces are applied in outline on the right in FIG. 8, to emphasize the location of the surfaces better.

The ring structure 80 is preferably arranged on the heel truncated cone FK and dimensioned in some embodiments so that the distance $a_2$ does not change in relation to a corresponding conventional bevel gear. The installation position thus remains the same and the formation of heel-side burrs 70 on the tooth base 68 is nonetheless prevented during the gear cutting.

Figure 9:
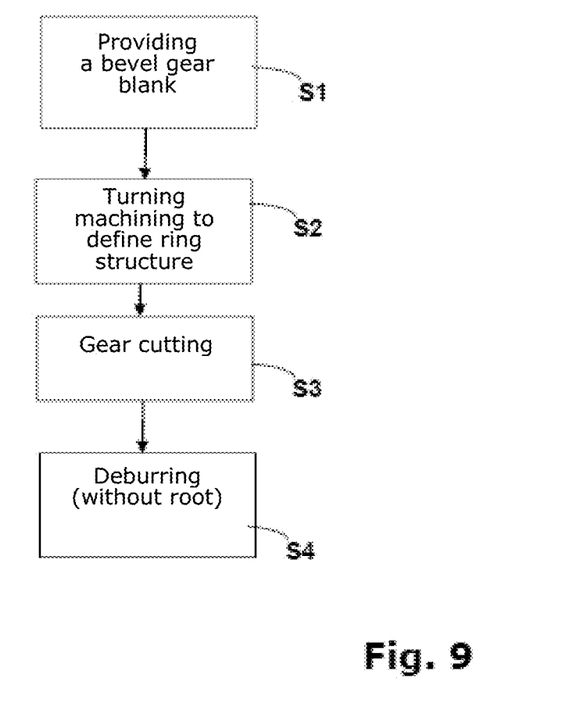
FIG. 9 is a schematic flow chart having the steps of an exemplary method according to the invention.

FIG. 9 shows a schematic flow chart of an exemplary production method of the invention. In a first step S1, a blank is provided, which is suitable for producing a bevel gear 31. For example, such a blank can have the shape of the main body 60 of FIG. 1B. This blank is now subjected in step S2 to turning machining, as is typical in the case of bevel gears. In this case, for example, the end faces can be turned to be planar. In addition, the ring structure 80 is created by turning machining. The position of the ring structure can be ascertained by a computer after the bevel gear 31 has been designed. In order that sufficient material is provided on the blank for the formation of the ring structure 80 by means of turning machining, a correspondingly enlarged or differently dimensioned heel cone FK is predefined.

After the ring structure 80 has been created or worked out, the gear cutting S3 (the production of the tooth gaps) follows according to a known method. In this case, burrs can form on the heel side (i.e., in the region of the heel truncated cone), wherein the burrs can only form at the exit edges of the tooth flanks according to the invention. No burr formation occurs on the tooth base. In the following step, the deburring S4 can be carried out in the gear cutting machine or in another machine, wherein no heel-side burrs 70 are to be deburred here. The deburring S4 is therefore less time-consuming and less costly than in the case of conventional bevel gears.

LIST OF REFERENCE SIGNS

| | |
|---|---|
| bevel gear | 31 |
| shaft | 32 |
| workpiece spindle | 33 |
| body | 60 |
| rear cone | 61 |
| head cone | 62 |
| index cone | 63 |
| installation surface/end face/heel | 64 |
| heel-side rear surface/ring-shaped skin surface | 65 |
| base cone | 66 |
| tooth gap | 67 |
| tooth base (root) | 68 |
| tooth flank | 69 |
| burr | 70 |
| cover surface of KK | 71 |
| main surface of KK | 72 |
| cover surface of FK | 73 |
| main surface of FK | 74 |
| teeth | 75 |
| circumferential ring structure | 80 |
| first ring surface | 81 |
| second ring surface | 82 |
| third ring surface | 83 |
| upper circular edge | 84 |
| axial component of the heel-side tooth height | $a_1$ |
| distance of outer head cone edge to the installation surface | $a_2$ |
| tooth width | b |
| base circle diameter | $d_{fe}$ |
| first base circle diameter | $d_{f1}$ |
| head cone angle | $\delta_a$ |
| base cone angle | $\delta_f$ |
| heel cone angle/rear cone angle | $\delta_v$ |
| effective heel cone angle | $\delta_{ve}$ |
| exit angle (without ring structure 80) | $\delta$ |
| exit angle | $\delta_1$ |
| angle of the heel edge | $\delta_2$ |
| heel truncated cone | FK |
| heel cone tip | FKs |
| tooth height | h |
| heel-side tooth height | $h_e$ |
| head truncated cone | KK |
| head cone tip | KKs |
| workpiece axis | R1 |
| parallel to the workpiece axis | R1∥ |
| transition region | P |
| outer head cone edge | P1 |
| rear cone length/heel cone length | $r_v$ |
| method steps | S1, S2, S3, S4 |
| critical region | X |

What is claimed is:

1. A bevel gear having a main body comprising a heel-side, ring-shaped skin surface arranged concentrically in relation to a workpiece axis of rotation of the bevel gear, wherein
the bevel gear has at least one tooth gap, which exits from the main body in the region of the skin surface,
the tooth gap has a tooth base, the profile of which is defined by a base cone angle in relation to the workpiece axis of rotation, and
a concentric circumferential ring structure is provided on the skin surface, which is raised in relation to the skin surface, and which results in a heel-side exit angle between the tooth base and the ring structure in the range between 125° and 160°.

2. The bevel gear according to claim 1, wherein the circumferential ring structure
comprises at least one first ring surface and one second ring surface and the ring structure has a triangular shape in an axial section through the bevel gear, or
comprises at least one first ring surface, one second ring surface, and one third ring surface, and the ring structure has a trapezoidal shape in an axial section through the bevel gear, or
has an edge-free configuration and has a convex shape in an axial section through the bevel gear.

3. The bevel gear according to claim 1, wherein, by way of the circumferential ring structure having the exit angle, in a heel-side exit region of the tooth gap, an effective heel cone angle is predefined and is less than the heel cone angle of the heel truncated cone.

4. The bevel gear according to claim 1, wherein the circumferential ring structure further comprises a first ring surface, which is part of a truncated cone, is arranged concentrically in relation to the workpiece axis of rotation, and has an effective heel cone angle that is less than the heel cone angle.

5. The bevel gear according to claim 1, wherein the heel-side, ring-shaped skin surface is part of a heel truncated cone skin surface of a heel truncated cone.

6. The bevel gear according to claim 5, further comprising, in addition to the heel truncated cone, at least one head truncated cone arranged concentrically in relation to the workpiece axis of rotation, wherein
the head truncated cone has a ring-shaped head truncated cone skin surface,
the head truncated cone is defined by a head cone angle in relation to the workpiece axis of rotation, which is between 0° and 90°, and
the heel truncated cone is defined by a heel cone angle in relation to the workpiece axis of rotation, which is between 0° and 90°.

7. The bevel gear according to claim 5, wherein the heel truncated cone is defined by a heel cone angle in relation to the workpiece axis of rotation, which is between 0° and 90°.

8. A method for producing a bevel gear comprising the following steps:
producing a bevel gear having a main body comprising a heel-side, ring-shaped skin surface arranged concentrically in relation to a workpiece axis of rotation of the bevel gear, said producing comprising:
providing a bevel gear blank;
carrying out turning machining of the bevel gear blank, wherein, in the scope of this turning machining, a concentric circumferential ring structure is provided on the ring-shaped skin surface, wherein the concentric circumferential ring structure is (i) arranged concentrically in relation to the workpiece axis of rotation of the bevel gear, (ii) raised in relation to the skin surface and (iii) results in a heel-side exit angle between the tooth base and the ring structure in the range between 125° and 160°; and
carrying out gear chip producing machining of the bevel gear blank, to form at least one tooth gap on the bevel gear, wherein the at least one tooth gap exits from the main body in the region of the skin surface and has a tooth base, the profile of which is defined by a base cone angle in relation to the workpiece axis of rotation.

9. The method according to claim 8, further comprising carrying out deburring machining of the bevel gear, wherein no deburring machining is carried out on the tooth base in the region of the heel-side skin surface.

10. The bevel gear according to claim 1, wherein the heel-side exit angle is in the range between 135° and 150°.

11. The bevel gear according to claim 10, wherein the circumferential ring structure comprises at least one first ring surface and one second ring surface and the ring structure has a triangular shape in an axial section through the bevel gear, or comprises at least one first ring surface, one second ring surface, and one third ring surface, and the ring structure has a trapezoidal shape in an axial section through the bevel gear, or has an edge-free configuration and has a convex shape in an axial section through the bevel gear.

12. The bevel gear according to claim 10, wherein, by way of the circumferential ring structure having the exit angle, in a heel-side exit region of the tooth gap, an effective heel cone angle is predefined and is less than the heel cone angle of the heel truncated cone.

13. The bevel gear according to claim 10, wherein the circumferential ring structure further comprises a first ring surface, which is part of a truncated cone, is arranged concentrically in relation to the workpiece axis of rotation, and has an effective heel cone angle that is less than the heel cone angle.

14. The bevel gear according to claim 10, wherein the heel-side, ring-shaped skin surface is part of a heel truncated cone skin surface of a heel truncated cone.

15. The bevel gear according to claim 14, further comprising, in addition to the heel truncated cone, at least one head truncated cone arranged concentrically in relation to the workpiece axis of rotation, wherein the head truncated cone has a ring-shaped head truncated cone skin surface, the head truncated cone is defined by a head cone angle in relation to the workpiece axis of rotation, which is between 0° and 90°, and the heel truncated cone is defined by a heel cone angle in relation to the workpiece axis of rotation, which is between 0° and 90°.

16. The bevel gear according to claim 14, wherein the heel truncated cone is defined by a heel cone angle in relation to the workpiece axis of rotation, which is between 0° and 90°.

* * * * *